United States Patent
Simon

(10) Patent No.: US 9,975,514 B1
(45) Date of Patent: May 22, 2018

(54) AUTOMOTIVE AIR BAG CHUTE DOOR HINGE WITH VARIABLE EXTENSION

(71) Applicant: Ford Global Technologies, LLC, Dearborn, MI (US)

(72) Inventor: Scott Simon, Dexter, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days. days.

(21) Appl. No.: 15/475,290

(22) Filed: Mar. 31, 2017

(51) Int. Cl.
*B60R 21/205* (2011.01)
*B60R 21/215* (2011.01)
*B60R 21/16* (2006.01)

(52) U.S. Cl.
CPC .......... *B60R 21/205* (2013.01); *B60R 21/215* (2013.01); *B60R 2021/161* (2013.01); *B60R 2021/21537* (2013.01)

(58) Field of Classification Search
None
See application file for complete search history.

(56) References Cited

U.S. PATENT DOCUMENTS

| | | | |
|---|---|---|---|
| 7,210,700 B2 | 5/2007 | Zagrodnicki et al. | |
| 7,740,269 B2 * | 6/2010 | Kang | B60R 21/2165 280/728.3 |
| 7,905,512 B2 * | 3/2011 | Park | B60R 21/2165 280/728.3 |
| 7,918,480 B2 | 4/2011 | Kwon et al. | |
| 8,590,923 B2 | 11/2013 | An | |
| 8,657,328 B2 | 2/2014 | Ory | |
| 8,672,344 B2 * | 3/2014 | Wagner | B60R 21/2165 280/728.3 |
| 9,352,716 B2 * | 5/2016 | Liu | B60R 21/215 |
| 2017/0043738 A1 * | 2/2017 | Peyre | B60R 21/214 |

* cited by examiner

*Primary Examiner* — Faye M Fleming
(74) *Attorney, Agent, or Firm* — Vichit Chea; MacMillan, Sobanski & Todd, LLC

(57) ABSTRACT

An air bag chute assembly attaches an air bag module to an automotive instrument panel. An outer collar attaches the assembly to the instrument panel. A tubular chute extends interiorly from the collar to a lower end defining a deployment path for the air bag. A door flap is disposed in an upper end of the chute rotatable from the collar to emerge from the instrument panel. A hinge attaching the door flap to the collar comprises a plurality of S-shaped extendable hinge straps laterally spaced along one edge of the door flap. A first hinge strap proximate one lateral end of the hinge has a first length shorter than a second length of a second hinge strap proximate an opposite lateral end of the hinge, thereby restricting rotation of the door flap at the one lateral end in order to avoid contacting a windshield during deployment.

11 Claims, 5 Drawing Sheets

AUTOMOTIVE AIR BAG CHUTE DOOR HINGE WITH VARIABLE EXTENSION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive air bag systems, and, more specifically, to a hidden air bag deployment door formed by an instrument panel substrate and a molded air bag chute.

Air bag deployment chute assemblies have been put into commercial use for the passenger side of an instrument panel of automotive vehicles. The chute assembly couples an air bag module (typically containing a folded canvas bag and chemical propellants for inflating the bag on command) to a door support panel or substrate of the instrument panel. A typical structure for a chute assembly includes a tubular outer chute wall, one or more door flaps, a flange surrounding the door area, and one or more hinge members or areas connecting the door flap(s) to the outer wall and flange.

For styling purposes, it is desirable for the air bag deployment door in the instrument panel to be invisible when viewed from the passenger compartment. In other words, the visible or "Class A" surface of the instrument panel is preferably seamless. Therefore, a pre-weakened seam is required in the substrate (on the "Class B" side) to facilitate tearing open of the door during air bag deployment. In order to prevent torn or severed pieces of the substrate from being expelled into the passenger cabin, the door flap(s) of the chute attach to the substrate door area so that the door flap and hinge act as a tether. A common method to attach the chute door flap and flange to the substrate has been by plastic welding, such as vibration welding, hot-plate welding, and the like.

For optimum protection of a passenger, the passenger-side air bag door is placed in or near the top surface of the instrument panel which results in the door being close to the front windshield of the vehicle. Consequently, impingement of the door against the windshield as it swings open during deployment of the air bag becomes a potential pitfall in the event the windshield could be damaged. Vehicle styling trends and a desire for improved aerodynamics often result in the slant (i.e., layback angle) of the windshield being increased and the front-to-back depth of the instrument panel being shortened. In addition, passenger air bags are becoming increasingly large and powerful, which raises the minimum required door size for accommodating deployment of the air bag. Consequently, the potential swing area of the air bag door becomes more likely to intersect with the windshield.

Due to its momentum from being forced open by the inflating air bag, the air bag door tends to swing beyond the opening size needed to expel the bag. To prevent this, it is known to attach an outer end of the door to the instrument panel via a tether. One or more tethers can be embedded in a chute assembly by overmolding or can be attached as a secondary operation. It would be desirable to avoid the added costs of components and/or assembly associated with tethers while both preventing door contact with the windshield and obtaining a sufficiently large door opening to accommodate a full capacity air bag.

SUMMARY OF THE INVENTION

In one aspect of the invention, an air bag chute assembly for an automotive instrument panel comprises an outer collar configured to attach to the instrument panel. A tubular chute extends interiorly from the collar to a lower end defining a deployment path configured to receive an inflating air bag from an air bag module. A door flap is disposed in an upper end of the chute rotatable from the collar to emerge from the instrument panel. A hinge attaching the door flap to the collar comprises a plurality of S-shaped extendable hinge straps laterally spaced along one edge of the door flap. A first hinge strap proximate one lateral end of the hinge has a first length which is shorter than a second length of a second hinge strap proximate an opposite lateral end of the hinge, thereby restricting rotation of the door flap at the one lateral end.

DETAILED DESCRIPTION OF PREFERRED EMBODIMENTS

Figure 1:
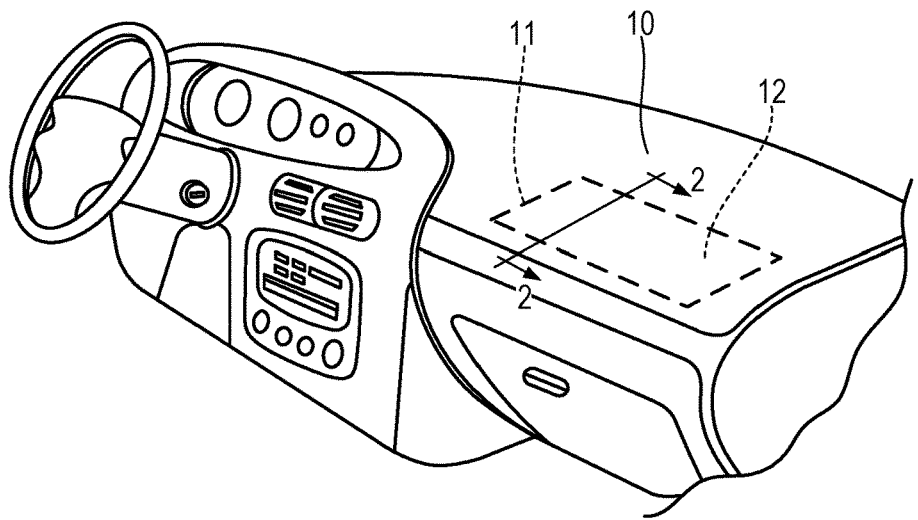
FIG. 1 is a perspective view of an automotive instrument panel system showing a passenger air bag deployment area.
Figure 2:
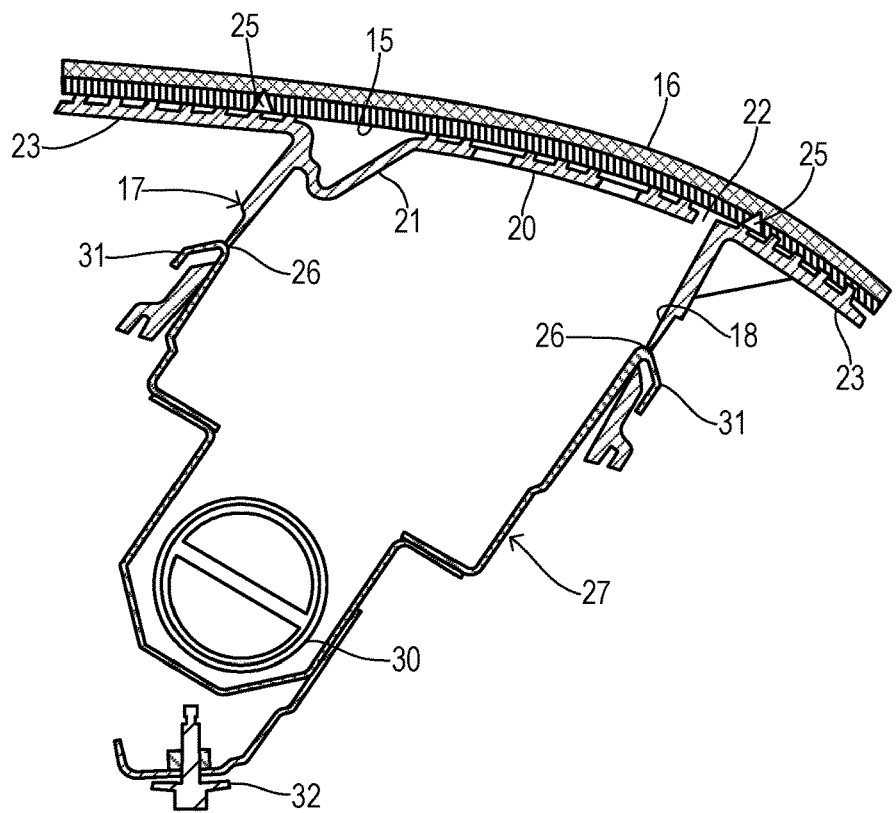
FIG. 2 is a cross-sectional view along line 2-2 of FIG. 1 showing one type of conventional passenger air bag system.
Figure 3:
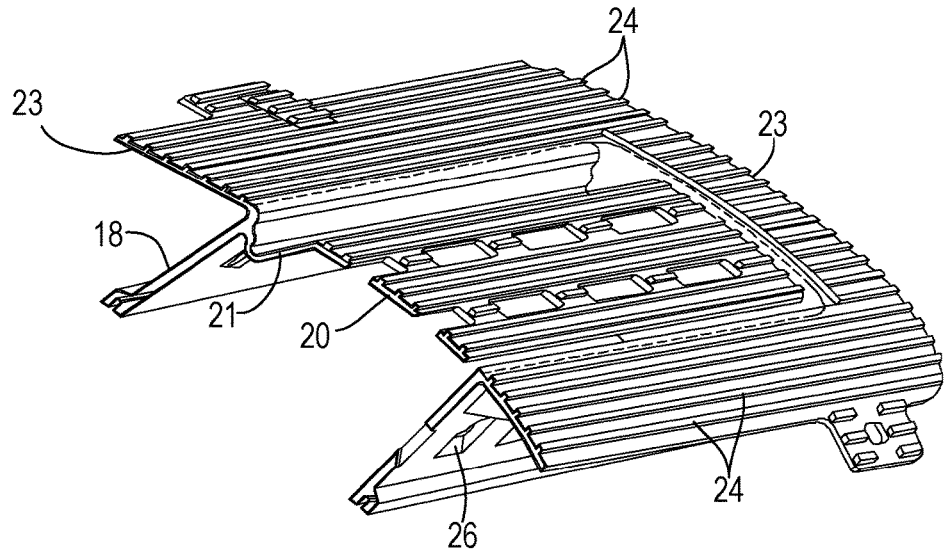
FIG. 3 is a cross-sectional, perspective view of the air bag chute assembly of FIG. 2.

Referring now to FIGS. 1-3, an instrument panel 10 includes a passenger air bag system with a hidden seam 11 defining a deployment door area 12. An instrument panel substrate 15 provides the desired shape and rigidity for the instrument panel. It is overlaid by a cover layer 16 which may include a conventional elastomeric skin and a layer of foam between the skin and substrate 15. A chute 17 includes a tubular passageway 18 and a deployment door flap 20 at the upper end thereof. Deployment door 20 is coupled to passageway 18 by a hinge 21 along one side. A gap 22 may define an outer edge on three sides of door 20, for example. Instead of a gap, a pre-weakened seam may be employed. Chute 17 includes a flange (collar) 23 surrounding door 20. As better shown in FIG. 3, flange 23 and door 20 have a plurality of ribs 24 for welding chute 17 to instrument panel substrate 15.

As shown in FIG. 2, instrument panel substrate 15 and covering layer 16 may include a hidden seam 25 for tearing during opening of deployment door 20. Seam 25 may be formed by mechanical or laser scoring prior to attachment of chute 17 by vibration welding. An air bag module 27 is mounted to a plurality of holes 26 in chute passageway 18. Air bag module 27 is comprised of a rigid box containing a propellant source 30 and a folded bag (not shown) that is guided along a deployment path defined by passageway 18 to door 20 upon inflation by gases from propellant source 30. Air bag module 27 includes a plurality of hooks 31 that are received in a corresponding plurality of windows 26. A fastener 32 couples air bag module 27 to a cross-car beam via a bracket.

Hinge 21 is preferably formed with an S-shaped or Z-shaped cross section so that hinge 21 extends lengthwise while simultaneously providing a pivot axis. Therefore, door flap 20 can expand upward more evenly during initial air bag deployment to provide better tearing of the tear seams, and can then pivot out of the way as the air bag emerges from chute 17.

For obtaining a desired strength and appearance, an instrument panel substrate and a chute may be preferably formed of moldable thermoplastic materials. Preferred materials include thermoplastic polyolefin (TPO), Thermal Plastic Elastomers (TPE), and Thermal Plastic Elastomer Olefin (TEO). The most preferred material is TPO compounded with fillers that modify the material's melting temperature, flexural modulus (i.e., stiffness), and other properties.

Air bag module 27 is configured to provide an optimal deployment profile for the air bag according to various parameters, such as bag volume, inflation time, gas flow rate, and others. A metal case and an outlet of air bag module 27 are sized according to these parameters. An internal diameter of chute passageway 18 is configured to match the outlet of module 27 to provide a smooth transition for the emerging air bag. Similarly, hinge 21 and door flap 20 have been configured to deploy in a manner that opens the top end of passageway 18 without restriction.

Figure 4:
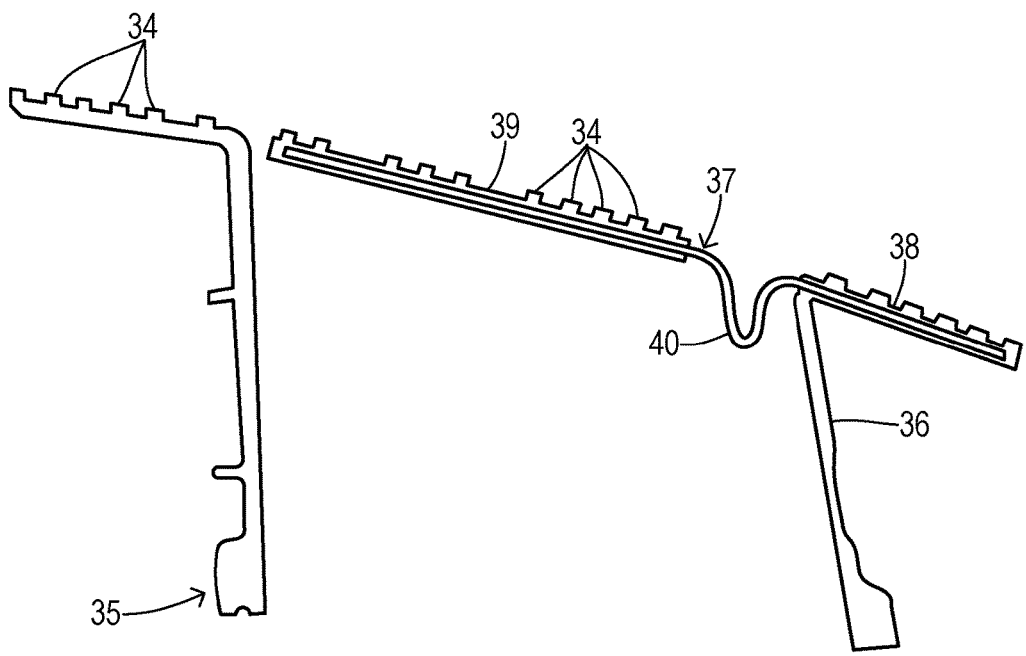
FIG. 4 shows a side, cross section of a chute assembly with a conventional overmolded sheet metal door panel.
Figure 5:
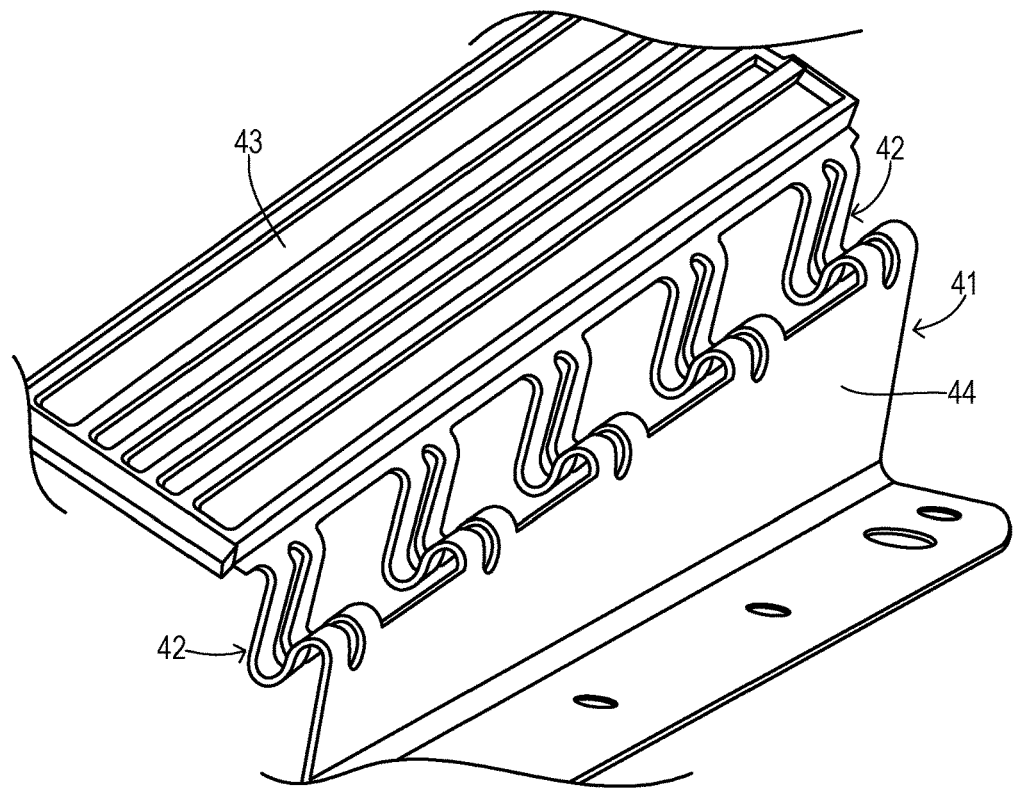
FIG. 5 is a perspective view of another conventional sheet metal door panel.

FIG. 4 shows an alternative embodiment of a chute assembly 35 having a main injection-molded body 36 and a stamped sheet-metal hinge plate 37. Opposing sides of plate 37 are insert molded into a chute collar outer flange 38 and a door flap 39 with a center hinge section 40 stamped with an S-shape to provide the desired opening profile. Collar 38 and door flap 39 preferably include welding ribs 34 on their upper surfaces for welding to an instrument panel substrate (not shown), as known in the art. FIG. 5 shows another stamped sheet-metal hinge plate 41 showing a series of S-shaped hinge straps 42 between a door plate insert-molded into a door flap 43 and a base plate 44 which in this embodiment is adapted to extend downward along (and insert molded into) a chute passageway (not shown). Hinge straps 42 may be arranged in closely-spaced pairs as shown. The number and individual widths of hinge straps 42 are configured to obtain an appropriate level of flexibility and strength, while the folded and unfolded lengths are configured to provide a desired movement profile when the hidden door is torn open.

Figure 6:
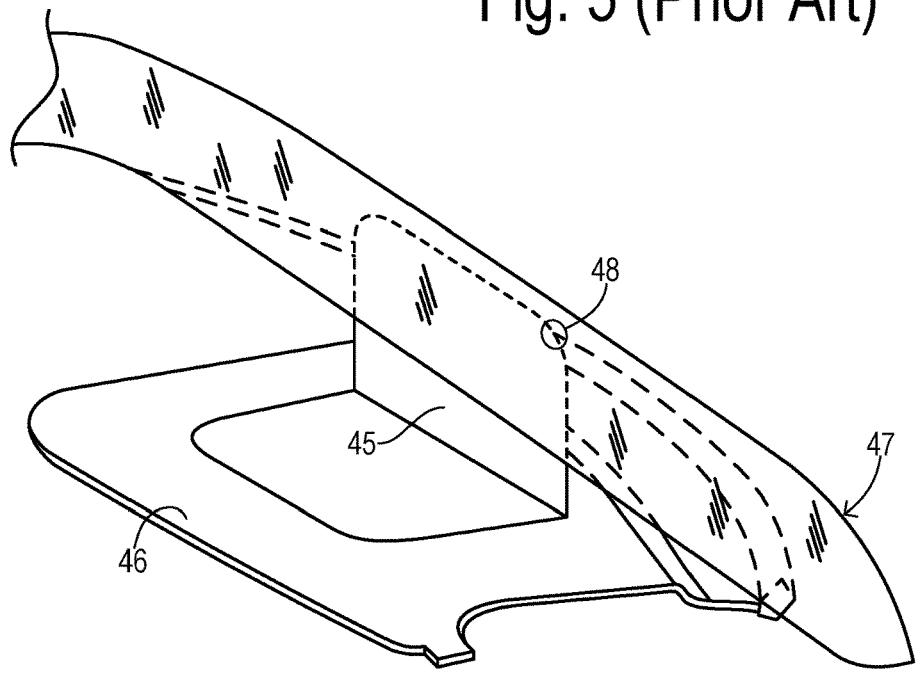
FIG. 6 shows a spatial relationship between a windshield and an air bag door.

As previously mentioned, styling and other design considerations for components of a motor vehicle such as the instrument panel front-to-back width and the angling of the windshield can result in a desired position for an air bag deployment door area that is close to the windshield. To keep the door out of the way of the deploying air bag and to minimize the throwing of any loose pieces into a passenger area, the hinge for a U-shaped, single-panel door is preferably placed at the car-forward side of the chute (i.e., the side closest to the windshield). If close enough, then a sweep zone of the door flap might overlap with the windshield so that an impact of the door against the windshield during air bag deployment could occur. For example, FIG. 6 shows a portion of a vehicle having an instrument panel trim piece 46 at a front passenger side of the vehicle, wherein a hidden door 45 has opened and pivoted toward a windshield 47. Due to the curvature of windshield 47, an outside corner of door 45 may impact windshield 47 at a nearest point 48 where the sweep zone is most likely to overlap the windshield. A smaller diameter chute with a shorter door flap could be used to reduce or eliminate the overlap, but it would be difficult and/or expensive to redesign/modify a customized air bag module with a sufficient inflation gas capacity and deployment profile to meet the performance requirements.

To solve the problem of over-rotation of a door flap without adding tethers to restrict the sweep zone of the door, the present invention utilizes a hinge structure having a plurality of undulating hinge straps with variable lengths. In particular, one or more hinge straps proximate one lateral end of the hinge (e.g., the end having a lower clearance distance from the windshield) have a first length which is shorter than a second length of the hinge straps proximate an opposite lateral end of the hinge, thereby restricting rotation of the door flap at the one lateral end.

Figure 7:
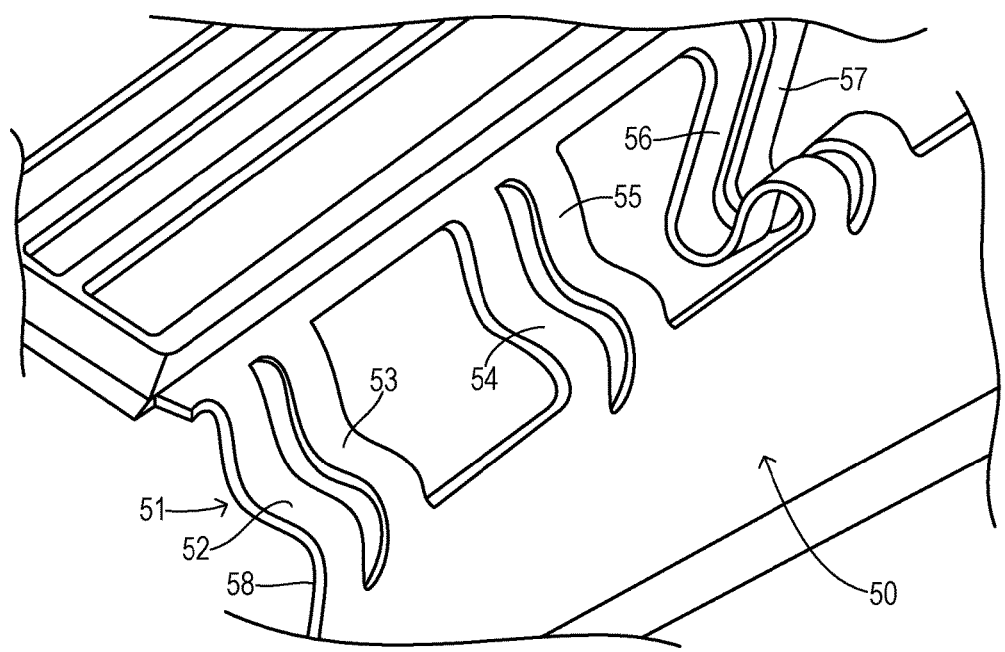
FIG. 7 is a perspective view of a sheet metal door panel of the invention having a variable hinge extension.

FIG. 7 shows a first embodiment of a sheet-metal plate 50 having a hinge section 51 with a plurality of individual hinge straps laterally spaced along one edge of a door flap and arranged in pairs (including hinge straps 52-57). Hinge section 51 has a lateral end 58 which is disposed closest to a right or left side of a vehicle (i.e., outboard side) where the air bag placement puts end 58 closest to the windshield (which could alternatively be on the opposite end from the one shown in FIG. 7 depending upon the details of the placement and the layout of the vehicle instrument panel and windshield, for example). At lateral end 58, one of more hinge straps proximate one lateral end of the hinge (such as a first hinge strap 52) has a first length which is shorter than a second length of a second hinge strap (such as a hinge strap 57) proximate an opposite lateral end of the hinge. As a result of the shortened length of hinge strap 52 (as well as straps 53-55 in this illustrated embodiment), a door sweep at lateral end 58 has a smaller radius than at the opposite lateral end. This restricts (i.e., shortens) outward rotation of the door flap at lateral end 58, so that an impact of the corresponding end of the door flap with the windshield can be avoided.

Figure 8:
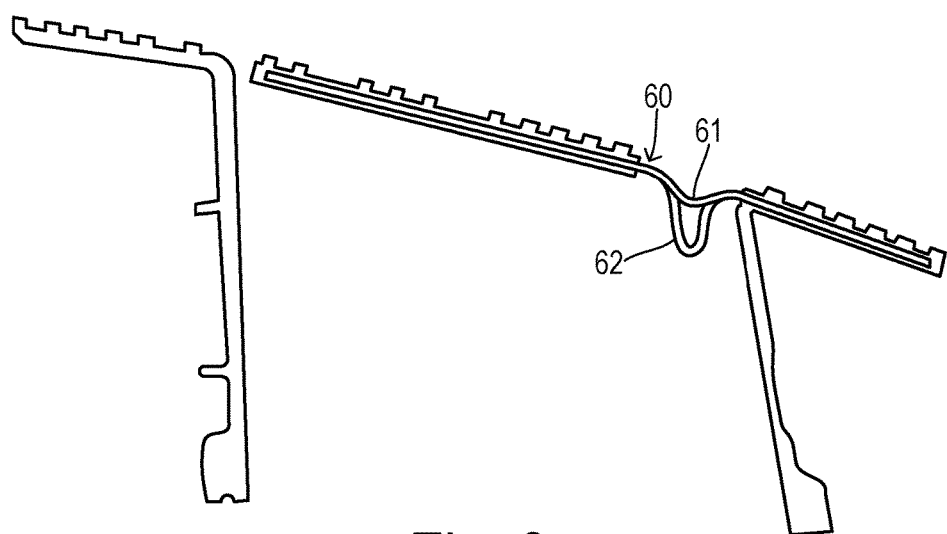
FIG. 8 is a side view of an air bag chute assembly having a sheet metal door panel with a variable hinge extension.

FIG. 8 is a side, cross-sectional view of another embodiment of a stamped sheet metal hinge plate 60 with an undulating hinge strap 61 proximate a near lateral end. Another undulating or S-shaped hinge strap 62 proximate the opposite lateral end of the hinge has a greater length so that it's folded position extends farther downward than hinge strap 61. Although it has a shorter unfolded length (i.e., shallower profile in the folded state), hinge strap 61 still has adequate length to allow tearing of the door seam and sufficient rotation of the door flap to allow a deploying air bag to freely exit the opened door. However, an uneven door swing is produced that shortens the sweep zone at the lateral edge of the door flap without adding any tethers or other supplemental parts.

Figure 9:
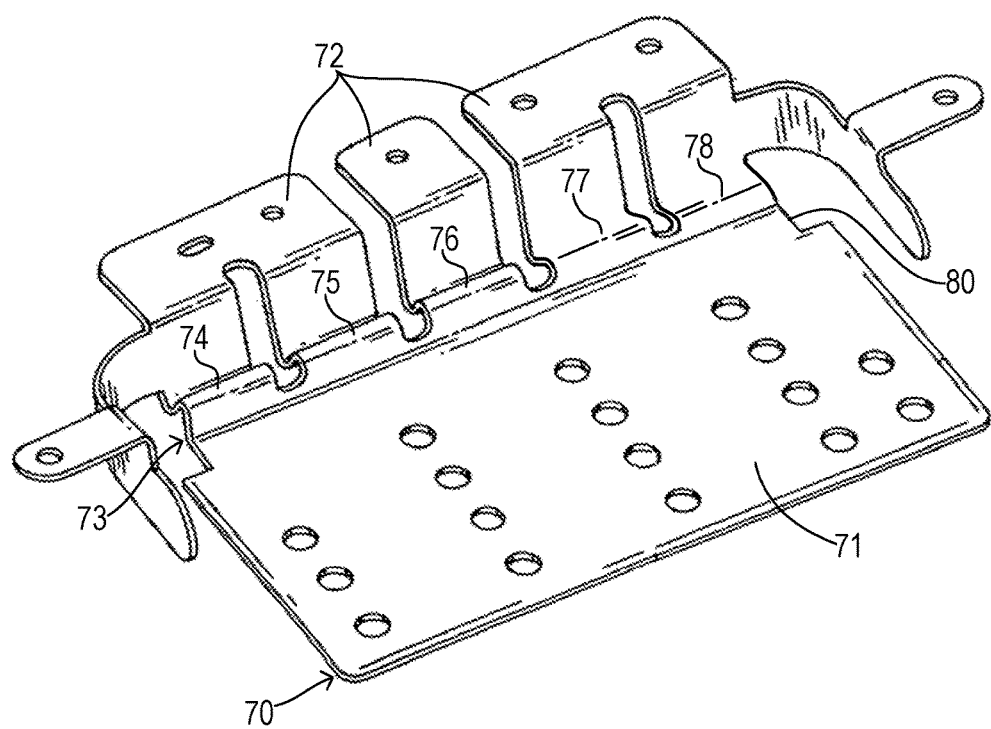
FIG. 9 is a perspective view of another embodiment of a sheet metal door panel with a variable hinge extension.

FIG. 9 shows yet another alternative embodiment of a metal door plate with a door flap 71 and mounting wings 72. A hinge 73 has individual straps 74-78 with variable strap lengths. A lateral end 80 is disposed closest to a windshield. Therefore, a hinge strap 78 has a shortest length and hinge straps 74-76 have a longest length. An intermediate strap 77 has an intermediate length.

The hinge of the invention can alternatively be fabricated entirely of injection molded plastic or other materials, either as an integral part of a single-piece chute assembly or as a separate hinge component affixed to the chute.

What is claimed is:

1. An air bag chute assembly for an automotive instrument panel, comprising:
   an outer collar configured to attach to the instrument panel;
   a tubular chute extending interiorly from the collar to a lower end defining a deployment path configured to receive an inflating air bag from an air bag module;
   a door flap disposed in an upper end of the chute rotatable from the collar to emerge from the instrument panel; and
   a hinge comprising a plurality of S-shaped extendable hinge straps laterally spaced along one edge of the door flap to attach the door flap to the collar, wherein a first hinge strap proximate one lateral end of the hinge has a first length which is shorter than a second length of a second hinge strap proximate an opposite lateral end of the hinge, thereby restricting rotation of the door flap at the one lateral end and producing uneven door swing.

2. The chute assembly of claim 1 wherein a third hinge strap adjacent the first hinge strap has the first length.

3. The chute assembly of claim 1 wherein a third hinge strap adjacent the first hinge strap has a third length between the first and second lengths.

4. The chute assembly of claim 1 wherein:
   the hinge is comprised of a center section of a stamped metal sheet;
   the collar, chute, and door flap are comprised of a molded plastic body wherein the collar and door flap include welding ribs adapted for welding to the instrument panel;
   a first side section of the metal sheet is insert molded into the door flap; and
   a second side section of the metal sheet is insert molded into at least one of the collar or chute.

5. The chute assembly of claim 1 wherein the plurality of hinge straps are arranged in pairs of more closely spaced straps.

6. A passenger air bag system, comprising:
   an instrument panel substrate defining an opening;
   a chute assembly installed at the opening; and
   an air bag module mounted to the chute assembly and comprising an inflatable bag for deploying through the chute assembly and opening;
   wherein the chute assembly comprises:
      an outer collar configured to attach to the instrument panel;
      a tubular chute extending interiorly from the collar to a lower end defining a deployment path configured to receive the inflating air bag from the air bag module;
      a door flap disposed in an upper end of the chute rotatable from the collar to emerge from the instrument panel via the opening; and
      a hinge comprising a plurality of S-shaped extendable hinge straps laterally spaced along one edge of the door flap to attach the door flap to the collar, wherein a first hinge strap proximate one lateral end of the hinge has a first length which is shorter than a second length of a second hinge strap proximate an opposite lateral end of the hinge, wherein a third hinge strap adjacent the first hinge strap has the first length, thereby restricting rotation of the door flap at the one lateral end.

7. The passenger air bag system of claim 6 wherein a fourth hinge strap between the first hinge strap has a third length between the first and second lengths.

8. The passenger air bag system of claim 6 wherein:
   the hinge is comprised of a center section of a stamped metal sheet;
   the collar, chute, and door flap are comprised of a molded plastic body wherein the collar and door flap include welding ribs adapted for welding to the instrument panel;
   a first side section of the metal sheet is insert molded into the door flap; and
   a second side section of the metal sheet is insert molded into at least one of the collar or chute.

9. The passenger air bag system of claim 6 wherein the plurality of hinge straps are arranged in pairs of more closely spaced straps.

10. An airbag chute, comprising:
    an elongated chute with a mounting flange surrounding a door flap; and
    a plurality of undulated hinge straps laterally spaced along one edge of the door flap attaching the edge to the flange, wherein a first hinge strap proximate one lateral end of the edge has a first length shorter than a second length of a second hinge strap proximate an opposite lateral end of the edge, producing uneven door swing.

11. An air bag chute assembly for an automotive instrument panel, comprising:
    an outer collar configured to attach to the instrument panel;
    a tubular chute extending interiorly from the collar to a lower end defining a deployment path configured to receive an inflating air bag from an air bag module;
    a door flap disposed in an upper end of the chute rotatable from the collar to emerge from the instrument panel; and
    a hinge comprising a plurality of S-shaped extendable hinge straps laterally spaced along one edge of the door flap to attach the one edge to the collar, wherein a first hinge strap proximate one lateral end of the hinge has a first length which is shorter than a second length of a second hinge strap proximate an opposite lateral end of the hinge, and wherein a third hinge strap between the first and second hinge straps has a third length between the first and second lengths, thereby restricting rotation of the door flap at the one lateral end and producing an uneven door swing.

* * * * *